Patented May 19, 1953

2,639,286

UNITED STATES PATENT OFFICE 2,639,286

ALKYLATION OF HETEROCYCLIC ORGANIC COMPOUNDS

Julian M. Mavity, Hinsdale, Ill., assignor to Universal Oil Products Company, Chicago, Ill., a corporation of Delaware No Drawing. Application July 29, 1948, Serial No. 41,396

17 Claims. (Cl. 260—329)

This application is a continuation in part of my copending application Serial No. 619,431, filed September 29, 1945, now Patent No. 2,467,326, April 12, 1949.

This invention relates to the catalytic interaction of a heterocyclic organic compound with a compound capable of yielding a hydrocarbon radical. It is more particularly concerned with the production of certain alkyl heterocyclic organic compounds by reacting a compound such as a thiophene or a furan that contains a hydrogen atom attached to the ring with an alkylating agent in the presence of a catalyst prepared by reacting boric acid and a metal halide of the Friedel-Crafts type.

Heterocyclic organic compounds, and particularly alkyl derivatives thereof, are increasing in use as intermediates in organic synthesis and in the production of plastics, germicides, medicinals, insecticides, and the like. I have invented a new and improved process for producing such compounds.

In one embodiment my invention relates to a process which comprises reacting a heterocyclic organic compound containing a substitutable hydrogen atom attached to the ring with a compound capable of yielding a hydrocarbon radical at condensation conditions in the presence of a catalyst prepared by reacting boric acid and a metal halide of the Friedel-Crafts type with the evolution of hydrogen halide.

In a more specific embodiment my invention relates to a process which comprises reacting a thiophene containing a substitutable hydrogen atom attached to the ring with an alkylating agent at alkylating conditions in the presence of a catalyst prepared by reacting boric acid and a metal halide of the Friedel-Crafts type with the evolution of hydrogen halide.

The alkylatable material charged to my process is selected from the class of heterocyclic organic compounds that are capable of condensing with alkylating agents and the like. Two of the preferred species of alkylatable materials comprise thiophenes and furans in which at least one hydrogen atom is bound to the heterocyclic ring of four carbon atoms and one sulfur or oxygen atom. The various reactive thiophenes and furans may be respectively represented by the formulas;

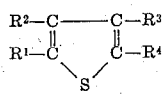 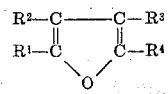

in which at least one of the groups $R^1$, $R^2$, $R^3$, and $R^4$ is a hydrogen atom and the other R groups are selected from the group consisting of hydrogen, alkyl, cycloalkyl, aryl, aralkyl, alkaryl, and naphthyl. Nonhydrocarbon substituents such as a halogen, alkoxy, or an alkyl thio group may be present provided the thiophene or furan contains at least one substitutable nuclear hydrogen atom. Less preferred species of alkylatable materials include indole and the like.

Alkylating agents capable of yielding an alkyl group under the conditions of operation employed in the process are one type of compound capable of yielding hydrocarbon radicals that are utilizable in my process. Compounds of this type include both normally gaseous and normally liquid olefins, particularly olefins containing more than two carbon atoms per molecule. Such olefins include propylene, iso and normal butylenes, iso and normal amylenes, methylcyclohexene, and the like. Other alkylating agents include cycloparaffins containing three or four carbon atoms in the ring, mercaptans, mineral acid esters such as alkyl halides, and alkoxy compounds of the class consisting of aliphatic alcohols, and esters of carboxylic acids. In general, the alkylating agents that are most easily reacted in my process comprise those in which the double bond, or in which the substituent, such as the chlorine atom in alkyl chlorides, is attached to a tertiary carbon atom. Other compounds capable of yielding a hydrocarbon radical include diolefins and aromatic compounds in which a nuclear hydrogen atom has been replaced by an olefinic hydrocarbon radical. Examples of such aromatic compounds are styrene, alpha methyl styrene, and the like.

I have found that catalysts useful in promoting the condensation of heterocyclic organic compounds containing a substitutable hydrogen atom attached to the ring with compounds capable of yielding hydrocarbon radicals may be made by interacting boric acid with a metal halide of the Friedel-Crafts type under such conditions that limited amounts of hydrogen halide are evolved, which amounts generally are from about 0.5 to about 2.0 molecular equivalents based upon the metal halide. With some of the metal halides, a reaction starts as soon as the metal halide is mixed with boric acid. However, I usually prefer to heat such mixtures to hasten said reaction. With other metal halides it is necessary to heat the mixtures in order to initiate the reaction. It is apparent that since there are a number of Friedel-Crafts type metal halides which may be interacted, a considerable number of alternative catalysts may be made although such catalysts will not necessarily be equivalent in their action. Friedel-Crafts type metal halides which may be reacted with boric acid to form catalysts useful in the present process include aluminum chloride, aluminum bromide, zinc chloride, zirconium chloride, ferric chloride, antimony chloride, bismuth chloride, and others. Substantially anhydrous aluminum chloride is the Friedel-Crafts type catalyst usually employed in the alkylation of heterocyclic organic compounds. However, disadvantages accompany its use in some instances on account of its high degree of activity. Thus it has a tendency to form undesirable complexes with unsaturated and heterocyclic compounds. However, by reacting proportioned mixtures of an aluminum halide, such as aluminum chloride, and boric acid in accordance with the present invention, catalysts of modified activities are obtained which may be utilized for promoting the alkylation of heterocyclic compounds as herein set forth. These catalysts do not form substantial amounts of complexes with the reactants and, accordingly, they may be used in continuous processes over long periods of time with relatively little contamination by such complexes so that in many instances the catalyst life is considerably longer than the life of the corresponding aluminum halide in similar types of reactions. An additional advantage of these catalysts is that their solubility in the products of this reaction is considerably less than that of metal halide, such as aluminum chloride and aluminum bromide, and thus the usual step of recovering dissolved catalyst from the reaction products often can be eliminated.

The process of my invention may be carried out in batch operation by placing a quantity of the catalyst in a reactor equipped with a stirring device, adding the heterocyclic organic compound, heating or cooling to the reaction temperature, slowly adding the alkylating agent while mixing the contents of the reactor, and recovering the product. However, the preferred method of operation is of the continuous type. In one mode of continuous operation, the granular catalyst, either alone or on a carrier, may be placed in a reaction chamber and preheated mixtures of the heterocyclic compound and the alkylating agent passed through the catalyst bed. If desired, a quantity of the hydrogen halide corresponding to the catalyst may be charged to the reaction zone as a promoter. The products from such a treatment may be continuously fractionated to separate the unreacted substances from the desired products.

The reactions herein described usually are carried out at temperatures of from about $-20°$ to about $150°$ C. and under a pressure of from substantially atmospheric to approximately 100 atmospheres. It ordinarily is preferable to have present in the charging stock a molecular excess of the heterocyclic compound over the alkylating agent in order to minimize side reactions.

The following examples are given to illustrate the method of preparing the catalyst and the results obtained by the use of the present process, although the data presented are to be taken in an illustrative and not in a limitative sense, i. e., the data are not to be taken as unduly restricting the generally broad scope of the invention.

Example I

A catalyst was prepared as follows:

20.64 grams (⅓ mol) of ball mill ground, C. P. boric acid and 133.52 grams (1.0 mol) of fresh C. P. anhydrous aluminum chloride were intimately mixed by rotating in a mill equipped with agate balls for 1.23 hours. 136.69 grams of the recovered mixture were transferred to an 850 cc. glass bomb liner and heated in a rotating steel bomb at $200°$ C. for 1 hour under an initial nitrogen pressure of 20 atmospheres. The nitrogen was present to prevent sublimation of the aluminum chloride before it had time to react with the boric acid. The material recovered from the liner weighed 124.63 grams; 12.06 grams of the starting material were lost as hydrogen chloride. The liner contents consisted of lumps of a white solid in the bottom of the liner with a hollow cylinder of similar material resting on the lumps and a small amount of white crystalline sublimate at the top of the liner. There was a strong hydrogen chloride odor. The liner was cut just above the hollow cylinder and the hollow cylinder together with the lumps that were in the bottom of the liner were rapidly ground in a mortar and stored in a glass stoppered bottle.

Example II

*Apparatus.*—250 cc. 3 necked flask with a drawoff equipped with a stopcock in the bottom, and fitted with a 19 in. reflux condenser, a 90 cc. calibrated cylindrical dropping funnel, and a mercury sealed stirrer. Also, a 22 in. and a 7 in. vacuum jacketed spiral wire filled column and a 100 cc. Claissen flask.

*Procedure.*—Into a stirred mixture of 12.17 grams of the catalyst prepared as described in Example I and 30 cc. of normal pentane, was introduced approximately ½ of 42.10 grams of thiophene. The temperature rose immediately from $33°$ to $36°$ C. and the color of the catalyst changed from white to red. The other ½ of the thiophene was mixed with 17.5 grams of isoamylenes and this mixture was added dropwise over a 5 minute period to the vigorously stirred mixture of catalyst, thiophene, and normal pentane at $36°$ C. The temperature of the reaction mixture rose $2°$ C. during the addition of the first half of the thiophene-isoamylene mixture and probably would have gone even higher if the $35°$ C. water bath had not been removed. Later on the water bath had to be used again to maintain a $37°$ C. reaction temperature. The stirring was continued for 2 hours after which approximately 100 grams of crushed ice were added to the reaction mixture, cooled to $5°$ C., to decompose the catalyst. The organic layer was separated from the aqueous layer and washed successively with water, 10% sodium hydroxide, and water and dried over sodium sulfate. Distillation and analysis of the crude product showed that a yield of 21 weight per cent of isoamylthiophene based on the isoamylenes charged had been produced in the reaction.

Example III

Isoamylenes are contacted with furan in the presence of a portion of the catalyst prepared as described under Example I. Contacting takes place in a manner similar to that described in Example II. Inspection of the product shows that an appreciable yield of isoamyl furan has been produced.

I claim as my invention:

1. A process which comprises reacting a heterocyclic organic compound selected from the group consisting of thiophenes and furans containing a substitutable hydrogen atom attached to a carbon atom of the heterocyclic ring with a compound capable of yielding a hydrocarbon radical at condensation conditions in the presence of a catalyst prepared by reacting boric acid and a metal halide of the Friedel-Crafts type with the evolution of hydrogen halide.

2. A process which comprises reacting a heterocyclic organic compound selected from the group consisting of thiophenes and furans containing a substitutable hydrogen atom attached to a carbon atom of the heterocyclic ring with an alkylating agent at alkylating conditions in the presence of a catalyst prepared by reacting boric acid and a metal halide of the Friedel-Crafts type with the evolution of hydrogen halide.

3. A process which comprises reacting a thiophene containing a substitutable hydrogen atom attached to the ring with an alkylating agent at alkylating conditions in the presence of a catalyst prepared by reacting boric acid and a metal halide of the Friedel-Crafts type with the evolution of hydrogen halide.

4. A process which comprises reacting a thiophene containing a substitutable hydrogen atom attached to the ring with an olefinic hydrocarbon at alkylating conditions in the presence of a catalyst prepared by reacting boric acid and a metal halide of the Friedel-Crafts type with the evolution of hydrogen halide.

5. A process which comprises reacting a thiophene containing a substitutable hydrogen atom attached to the ring with a monoolefin at alkylating conditions in the presence of a catalyst prepared by reacting boric acid and a metal halide of the Friedel-Crafts type with the evolution of hydrogen halide.

6. A process which comprises reacting a thiophene containing a substitutable hydrogen atom attached to the ring with a monoolefin containing more than two carbon atoms per molecule at alkylating conditions in the presence of a catalyst prepared by reacting boric acid and a metal halide of the Friedel-Crafts type with the evolution of hydrogen halide.

7. A process which comprises reacting a thiophene containing a substitutable hydrogen atom attached to the ring with an isoolefin at alkylating conditions in the presence of a catalyst prepared by reacting boric acid and a metal halide of the Friedel-Crafts type with the evolution of hydrogen halide.

8. A process which comprises reacting a thiophene containing a substitutable hydrogen atom attached to the ring with an isoamylene at alkylating conditions in the presence of a catalyst prepared by reacting boric acid and a metal halide of the Friedel-Crafts type with the evolution of hydrogen halide.

9. A process which comprises reacting a furan containing a substitutable hydrogen atom attached to the ring with an alkylating agent at alkylating conditions in the presence of a catalyst prepared by reacting boric acid and a metal halide of the Friedel-Crafts type with the evolution of hydrogen halide.

10. A process which comprises reacting a furan containing a substitutable hydrogen atom attached to the ring with an olefinic hydrocarbon at alkylating conditions in the presence of a catalyst prepared by reacting boric acid and a metal halide of the Friedel-Crafts type with the evolution of hydrogen halide.

11. A process which comprises reacting a furan containing a substitutable hydrogen atom attached to the ring with a monoolefin at alkylating conditions in the presence of a catalyst prepared by reacting boric acid and a metal halide of the Friedel-Crafts type with the evolution of hydrogen halide.

12. A process which comprises reacting a furan containing a substitutable hydrogen atom attached to the ring with a monoolefin containing more than two carbon atoms per molecule at alkylating conditions in the presence of a catalyst prepared by reacting boric acid and a metal halide of the Friedel-Crafts type with the evolution of hydrogen halide.

13. A process which comprises reacting a furan containing a substitutable hydrogen atom attached to the ring with an isoolefin at alkylating conditions in the presence of a catalyst prepared by reacting boric acid and a metal halide of the Friedel-Crafts type with the evolution of hydrogen halide.

14. A process which comprises reacting a furan containing a substitutable hydrogen atom attached to the ring with an isoamylene at alkylating conditions in the presence of a catalyst prepared by reacting boric acid and a metal halide of the Friedel-Crafts type with the evolution of hydrogen halide.

15. A process which comprises reacting a heterocyclic organic compound selected from the group consisting of thiophenes and furans containing a substitutable hydrogen atom attached to a carbon atom of the heterocyclic ring with an alkylating agent at a temperature of from about $-20°$ C. to about $150°$ C. and under a pressure of from substantially atmospheric to approximately 100 atmospheres in the presence of a catalyst prepared by reacting boric acid and a metal halide of the Friedel-Crafts type with the evolution of hydrogen halide.

16. A process which comprises reacting a heterocyclic organic compound selected from the group consisting of thiophenes and furans containing a substitutable hydrogen atom attached to a carbon atom of the heterocyclic ring with an alkylating agent at a temperature of from about $-20°$ C. to about $150°$ C. and under a pressure of from substantially atmospheric to approximately 100 atmospheres in the presence of a catalyst prepared by reacting boric acid and an aluminum halide with the evolution of hydrogen halide.

17. A process which comprises reacting a heterocyclic organic compound selected from the group consisting of thiophenes and furans containing a substitutable hydrogen atom attached to a carbon atom of the heterocyclic ring with an alkylating agent at a temperature of from about $-20°$ C. to about $150°$ C. and under a pressure of from substantially atmospheric to approximately 100 atmospheres in the presence of a catalyst prepared by reacting boric acid and aluminum chloride with the evolution of hydrogen chloride.

JULIAN M. MAVITY.

References Cited in the file of this patent

UNITED STATES PATENTS

| Number | Name | Date |
|---|---|---|
| 2,141,611 | Malishev | Dec. 27, 1938 |
| 2,341,362 | Connolly | Feb. 8, 1944 |
| 2,396,144 | Anderson | Mar. 5, 1946 |
| 2,407,918 | Burgin | Sept. 17, 1946 |
| 2,408,167 | Hepp | Sept. 24, 1946 |
| 2,432,482 | Matuszak | Dec. 9, 1947 |
| 2,467,326 | Mavity | Apr. 12, 1949 |

OTHER REFERENCES

Calloway: "Chemical Review," vol. 17, page 376 (1935).

Richter: "Organic Chemistry," Wiley (1938), pages 649-650.

Berkman: "Catalysis," Rheinhold Publishing Corporation (1940), page 953.